April 18, 1967          K. SOMMERER          3,314,716
DRIVER'S SEAT AND BRAKE ACTUATING MECHANISM
Filed May 7, 1965
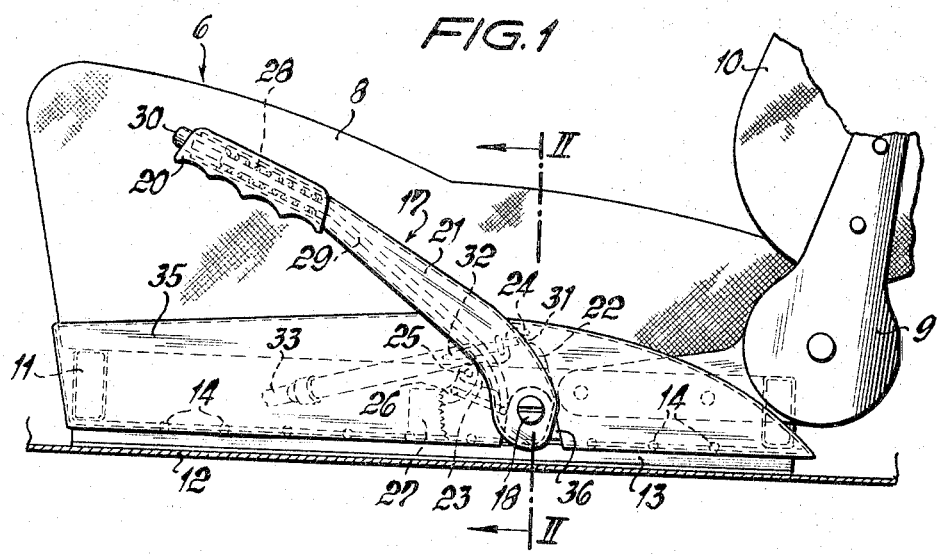
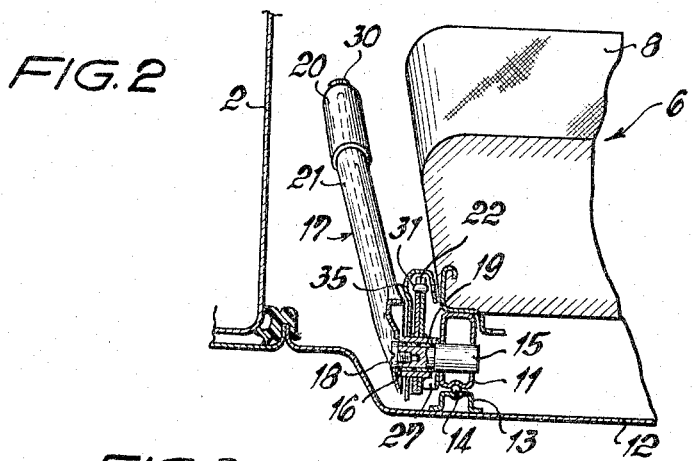
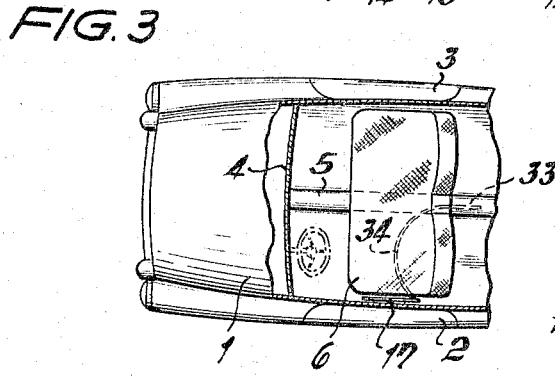
INVENTOR
Karl SOMMERER
BY Dicke & Craig
ATTORNEYS

United States Patent Office 3,314,716
Patented Apr. 18, 1967

3,314,716
DRIVER'S SEAT AND BRAKE ACTUATING MECHANISM
Karl Sommerer, Stuttgart-Zuffenhausen, Germany, assignor to Firma Dr. Ing. h.c. F. Porsche KG., Stuttgart-Zuffenhausen, Germany
Filed May 7, 1965, Ser. No. 453,971
Claims priority, application Germany, May 13, 1964, P 34,266
10 Claims. (Cl. 296—65)

The present invention relates to an actuating lever for parking brakes of motor vehicles which is arranged within the area of an adjustable vehicle seat.

It is already known with vehicles having a continuous seat bench or individual seats disposed closely adjacent one another to arrange the actuating lever of the parking brake between the driver and the passenger, seated alongside the driver, in front of the seating bench or between the seats, respectively. This arrangement, however, has the disadvantage that, if the driver wears a safety belt and his seat is displaced completely toward the rear in the driving direction, he cannot reach the actuating lever or can reach the same only with great difficulty. Also constructions in which the actuating lever is constructed as a handle-like manually operated lever arranged below the dashboard or instrument panel have the same disadvantages. Additionally, the safety of the driver is impaired by the protruding brake lever. If, however, the lever of the parking brake is arranged between the vehicle door and the driver seat at the body of the vehicle, the boarding and leaving of the vehicle is impaired by the projecting actuating lever with an adjusted seat. Furthermore, the actuating lever projects above the seat surface with a seat adjusted completely forwardly, as viewed in the driving direction, and with a pulled-up parking brake, which leads to body injuries.

These disadvantages are avoided according to the present invention in that the actuating lever is pivotally supported on a bolt at a displaceable part of the vehicle seat. As a result thereof, during displacement or adjustment of the seat, the actuating lever is moved in unison therewith and is always located thereby in the same and therewith favorable position relative to the driver. Additionally, the actuating lever can no longer project in the pulled-up position beyond the seat contour whereby any injuries of the driver are precluded. The lever is arranged on the side of the seat facing the vehicle door. This is of advantage insofar as during pushing of the vehicle in case of breakdowns or the like, the hand lever can be easily reached from the outside. The transmission element of the lever, known per se, which acts on the wheel brakes consists of a Bowden cable which is placed loosely below the seat in the form of a bow or arc. A flexible connection of the actuating lever with the wheel brakes is achieved thereby which permits an adjustment of the seat over a large range. A detent mechanism of conventional construction is coordinated to the actuating lever which detent mechanism is covered by a decorative strip extending along the seat frame. This decorative strip or cover prevents parts of the clothing getting stuck in the detent mechanism or becoming soiled by oil adhering to the Bowden cable.

Accordingly, it is an object of the present invention to provide an actuating mechanism for parking brakes of the type described above which eliminates, by extremely simple means, the aforementioned shortcomings and drawbacks encountered with the prior art constructions.

Another object of the present invention resides in the provision of a parking brake actuating mechanism that can be easily reached by the driver regardless of the position to which the driver's seat is adjusted.

Still another object of the present invention resides in the provision of a brake actuating mechanism which can be easily handled by the driver under all driving conditions yet does not protrude beyond the contour of the seat cushion thereby increasing the safety to the driver.

Still a further object of the present invention resides in the provision of a parking brake actuating lever for motor vehicles which, though arranged between the door and the driver's seat, does not impair the ease of ingress into or egress from the vehicle.

Another object of the present invention resides in the provision of a hand brake actuating lever so constructed and arranged at the driver's seat that it always remains in the same and therewith in a favorable position relative to the driver.

A still further object of the present invention resides in the provision of a brake actuating lever for the hand brakes of passenger motor vehicles which not only permits an adjustment of the seat over a large area but also prevents damage to the clothes of the driver by the latch mechanism of the hand brake and/or soiling of the clothes by oil of the hand brake actuating mechanism.

These and further objects, features and advantages of the present invention will become more obvious from the following description when taken in connection with the accompanying drawing which shows, for purposes of illustration only, one embodiment in accordance with the present invention, and wherein:

FIGURE 1 is a partial elevational view of a vehicle seat provided with a bearing support of the hand lever of a parking brake in the pulled-up position thereof in accordance with the present invention, FIGURE 2 is a partial cross sectional view taken along line II—II of FIGURE 1, and FIGURE 3 is a schematic plan view on a part of a passenger motor vehicle indicating the arrangement of the hand lever and of the actuating elements of the parking brake on a reduced scale.

Referring now to the drawing wherein like reference numerals are used throughout the various views to designate like parts, reference numeral 1 designates in FIGURE 3 a passenger space or passenger compartment of a motor vehicle which is delimited in the lower area thereof essentially by sidewalls and/or doors 2 and 3, by a dashboard 4 and by a rear wall not shown in the drawing. The passenger space 1 also includes a longitudinal bearer member 5. A seat 6 is arranged within the passenger space 1.

The seat generally designated in FIGURE 1 by reference numeral 6, which may be a continuous seat bench or individual seats, is composed of a seat cushion 8 and of a back rest 10 pivotally supported thereon by means of a fitting 9. The seat cushion 10 is retained within a seat frame 11 which is supported by way of ball bearings 14 on a frame 13 secured at the vehicle floor 12. A bolt 15 is secured at the frame 11 on the side of the seat 6 coordinated to the door 2. A hand lever generally designated by reference numeral 17 of a parking brake is supported on the bolt 15 by the interposition of a bushing 16 of plastic material or the like. The hand lever 17 is retained in the axial direction thereof by a screw 18 or the like. The hand lever 17 is composed of a sleeve portion 19 and of a sheet metal stamping 21 non-detachably connected therewith and provided with a handle 20. A plate 22 is secured at the sleeve 19 which is provided with two projections 23 and 24. A dog or pawl 26 is supported at the projection 23 by means of a pin 25 which pawl cooperates with a detent segment 27 arranged at the frame 11. The pawl or dog 26 is actuated by a rod 29 subjected to the force of a compression spring 28 which rod 29 is provided with a pushbutton 30 at the end thereof coordinated to the handle 20 of the lever 17. The projection 24 of the plate 22 is constructed of hook shape and engages into an eye or lug 31 of a cable 32. The cable 32 is guided within a flexible tubular member 33 which is supported at the frame 11 as well as the central longitudinal bearer 5. The flexible tubular member 33 is placed loosely on the vehicle floor 12 in the shape of an arc 34 in order to compensate for a change in length during adjustment of the seal.

The detent mechanism 26, 27 as well as the plate 22 are covered by a decorative strip or cover 35 which is secured at the frame 11 and is provided with an aperture 36 within the area of the bolt 15.

While I have shown and described one embodiment in accordance with the present invention, it is understood that the same is not limited thereto but is susceptible of numerous changes and modifications as known to a person skilled in the art and I therefore do not wish to be limited to the details shown and described herein, but intend to cover all such changes and modifications as are encompassed by the scope of the appended claims.

I claim:

1. An actuating lever arrangement for parking brakes of motor vehicles having an adjustable driver seat, comprising:
   parking-brake actuating lever means,
   vehicle seat means including an adjustable part,
   and means including bolt means pivotally supporting said actuating lever means on the adjustable part of the vehicle seat means.

2. An actuating lever arrangement for parking brakes of motor vehicles having an adjustable driver seat and a door in the body thereof adjacent the driver seat, comprising:
   parking-brake actuating lever means,
   vehicle seat means including an adjustable part,
   means including bolt means pivotally supporting said actuating lever means on the adjustable part of the vehicle seat means,
   said lever means being arranged on the side of the seat means facing the vehicle door.

3. An actuating lever arrangement for parking brakes of motor vehicles having wheel brake means, an adjustable driver seat, comprising:
   parking-brake actuating lever means,
   vehicle seat means including an adjustable part,
   and means including bolt means pivotally supporting said actuating lever means on the adjustable part of the vehicle seat means,
   and means operatively connecting said lever means with the wheel brake means including a transmission element consisting of a Bowden cable placed loosely below the seat means in the form of an arc.

4. An actuating lever arrangement for parking brakes of motor vehicles having an adjustable driver seat, comprising:
   parking-brake actuating lever means,
   vehicle seat means including an adjustable part and a seat frame,
   and means including bolt means pivotally supporting said actuating lever means on the adjustable part of the vehicle seat means,
   detent means cooperating with said actuating lever means,
   and cover means extending along the frame of the seat means covering said detent means.

5. An actuating lever arrangement for parking brakes of motor vehicles having an adjustable driver seat, wheel brake means and a door in the body thereof adjacent the driver seat, comprising:
   parking-brake actuating lever means,
   vehicle seat means including an adjustable part,
   means including bolt means pivotally supporting said actuating lever means on the adjustable part of the vehicle seat means,
   said lever means being arranged on the side of the seat means facing the vehicle door,
   and means operatively connecting said lever means with the wheel brake means including a transmission element consisting of a Bowden cable placed loosely below the seat means in the form of an arc.

6. An actuating lever arrangement for parking brakes of motor vehicles having an adjustable driver seat and a door in the body thereof adjacent the driver seat, comprising:
   parking-brake actuating lever means,
   vehicle seat means including a seat frame and an adjustable part,
   means including bolt means pivotally supporting said actuating lever means on the adjustable part of the vehicle seat means,
   said lever means being arranged on the side of the seat means facing the vehicle door,
   detent means cooperating with said actuating lever means,
   and cover means extending along the frame of the seat means covering said detent means.

7. An actuating lever arrangement for parking brakes of motor vehicles having wheel brake means, an adjustable driver seat, comprising:
   parking-brake actuating lever means,
   vehicle seat means including an adjustable part and a seat frame,
   and means including bolt means pivotally supporting said actuating lever means on the adjustable part of the vehicle seat means,
   and means operatively connecting said lever means with the wheel brake means including a transmission element consisting of a Bowden cable placed loosely below the seat means in the form of an arc,
   detent means cooperating with said actuating lever means,
   and cover means extending along the frame of the seat means covering said detent means.

8. An actuating lever arrangement for parking brakes of motor vehicles having an adjustable driver seat, wheel brake means and a door in the body thereof adjacent the driver seat, comprising:
   parking-brake actuating lever means,
   vehicle seat means including a seat frame and an adjustable part,
   means including bolt means pivotally supporting said actuating lever means on the adjustable part of the vehicle seat means,
   said lever means being arranged on the side of the seat means facing the vehicle door,
   and means operatively connecting said lever means with the wheel brake means including a transmission element consisting of a Bowden cable placed loosely below the seat means in the form of an arc,
   detent means cooperating with said actuating lever means,
   and cover means extending along the frame of the seat means covering said detent means.

9. A motor vehicle, comprising; a vehicle frame including a floor board; a driver's seat having a lower seat cushion and a backrest; means mounting said driver's seat on said floor board for horizontal adjustment forwardly and rearwardly relative to said frame and floor board; manually actuatable brake means for retarding movement of the vehicle; said brake means including a hand actuator mounted on said driver's seat for joint adjustment movement with said driver's seat relative to said frame.

10. The motor vehicle according to claim 9, wherein said frame includes a driver's door immediately adjacent to said driver's seat; said hand actuator includes a lever pivotally mounted on said driver's seat on the side facing said door, detent means for automatically latching said lever in its actuated position, and release means for manually releasing said detent means to unlatch said lever; said brake means includes a Bowden wire connected at one end to said lever, and flexible tube means for guiding said wire between said one end and said frame extending loosely in an arc under said driver's seat to compensate for said seat adjustment.

References Cited by the Examiner
UNITED STATES PATENTS

| | | | |
|---|---|---|---|
| 1,663,785 | 3/1928 | White et al. | 74—538 X |
| 2,892,487 | 6/1959 | Herider et al. | 74—535 X |
| 3,077,790 | 2/1963 | Wolfe | 74—506 |
| 3,216,276 | 11/1965 | Nagy. | |

FRED C. MATTERN, JR., *Primary Examiner.*

C. F. GREEN, *Assistant Examiner.*